United States Patent [19]

Martin

[11] 4,149,316
[45] Apr. 17, 1979

[54] POSITION MEASURING APPARATUS AND METHODS OF CONSTRUCTING AND UTILIZING SAME

[76] Inventor: Spencer W. Martin, 8436 Buffalo Dr., Union Lake, Mich. 48085

[21] Appl. No.: 842,581

[22] Filed: Oct. 17, 1977

[51] Int. Cl.² ............................................. G01B 3/12
[52] U.S. Cl. .................................. 33/1 SB; 33/1 SD; 33/1 CC; 35/25
[58] Field of Search ................ 33/1 SB, 1 CC, 1 SA, 33/1 SC, 1 SD; 35/25

[56] References Cited

U.S. PATENT DOCUMENTS

| | | | |
|---|---|---|---|
| 2,141,696 | 12/1938 | Rodd et al. | 33/1 CC |
| 2,674,804 | 4/1954 | Reinhardt | 33/1 SD |

FOREIGN PATENT DOCUMENTS 509633  1/1955  Italy ............................................. 33/1 CC

*Primary Examiner*—Charles E. Phillips
*Assistant Examiner*—Willis Little
*Attorney, Agent, or Firm*—Pamela S. Austin

[57] ABSTRACT

A position measuring apparatus for accurately determining a second position relative to a predetermined first position of an object to be moved. The apparatus is particularly adapted for use in a game situation, such as a war game, wherein a ship or aircraft is to be moved according to a specified set of speed and direction conditions from a precisely defined first position to a precisely determined and defined second position.

11 Claims, 3 Drawing Figures

POSITION MEASURING APPARATUS AND METHODS OF CONSTRUCTING AND UTILIZING SAME

BACKGROUND OF THE INVENTION

1. Field of the Invention

The present invention relates generally to a position measuring apparatus for accurately determining a second position of an object to be moved relative to a precisely defined first position of the object.

More particularly, the present invention provides an apparatus for use in a game situation, the apparatus being adapted to accurately position an object to be moved, such as a model ship, in a first predetermined position to accurately measure from the first position to a second position, according to specified direction and speed conditions.

2. Description of the Prior Art

In recent times there has developed an ever-increasing interest in games of the type referred to as "war games," due in part to their historical basis in some cases and in general to the amusement offered by such games. In many instances, war games are based on actual real-life historical battles, such as battles which took place during World War II. Regardless of their particular nature, a factor common to most war games is that it is often necessary to move objects, such as model ships and aircraft, according to a set of predetermined factors, such as a predetermined speed and angular direction of movement. In such instances, for example, during a player's turn he is supplied with a particular angular direction of movement as well as a particular speed, such as knots in the case of ships. Because it is desirable to accurately measure from an initial position of the craft to a second position which is dependent upon both theoretical speed and angular direction, there has developed a need for an accurate measuring instrument for determining such second position relative to the initial position.

In an effort to fill such need for accurate determination of a second position relative to a first position, there have been developed a variety of rather complicated systems and/or devices. Such available move systems and devices fall generally into two categories. In a first type, an angular course for a given craft is measured by turning at a sharp measured angle, moving in a straight line, and then turning to move in a straight line again, etc. A second type of system employs a collection of turn templates wherein a different template is employed as the occasion requires. Different size circle templates are used for different crafts and/or different speeds. This system either restricts the possible curve radii, or requires large numbers of different templates.

In general, such systems are marked by their complexity, excessive time consumption in a game playing situation, and other undesirable features.

The present invention is directed to solving the aforementioned problems associated with prior art systems and devices, and provides an apparatus for conveniently, rapidly, and accurately filling the above-described need of war game players. In addition to its usefulness in war game situations, the present invention may be employed in a host of educational and other applications wherein it is desired to move an object according to a set of predetermined factors, such as direction and theoretical speed. At the same time, the present invention provides an apparatus which is inexpensive to manufacture, employs a minimum of parts, and is easily employed for accurate position determinations.

SUMMARY OF THE INVENTION

The present invention provides an apparatus for measuring relative positions of an object to be moved which includes first means for indicating the direction of movement for the object to be moved. The first means includes a first member with the first member being provided with means for positioning in a first predetermined position the object to be moved. The first means also includes a second member, the second member being adapted to cooperate with the first member to selectively indicate a predetermined position of the object to be moved. Also included is second means for determining a second position of the object to be moved, with the second means being adapted to cooperate with the first means so as to measure from the first predetermined position to the second position along a predetermined angular course of the object to be moved.

It is an object of the present invention to provide an apparatus wherein the first member comprises a circular protractor having angular gradations indicated adjacent the periphery of a first surface thereof. The protractor is provided with a slot for positioning the object in the first predetermined position. The second member comprises a pointer pivotably secured at a first end thereof to a central portion of the protractor adjacent the first surface of the protractor, with the pointer being adapted to be selectively angularly displaceable on the first surface of the protractor to permit a second end of the pointer to selectively point to a predetermined one of the angular gradations on the protractor. The second means comprises an elongated bendable speed scale of fixed length and capable of being readily curved into a smooth arc, and having speed graduations indicated thereon for measuring theoretical speeds of the object to be moved.

It is a further object of the invention to provide an apparatus wherein the free end of the speed scale is adapted to be selectively angularly displaced adjacent a surface exterior to the apparatus to permit the second position of the object to be determined.

Other objects and details of the present invention will become apparent from the following description, when read in conjunction with the accompanying drawings.

DETAILED DESCRIPTION

Figure 1:
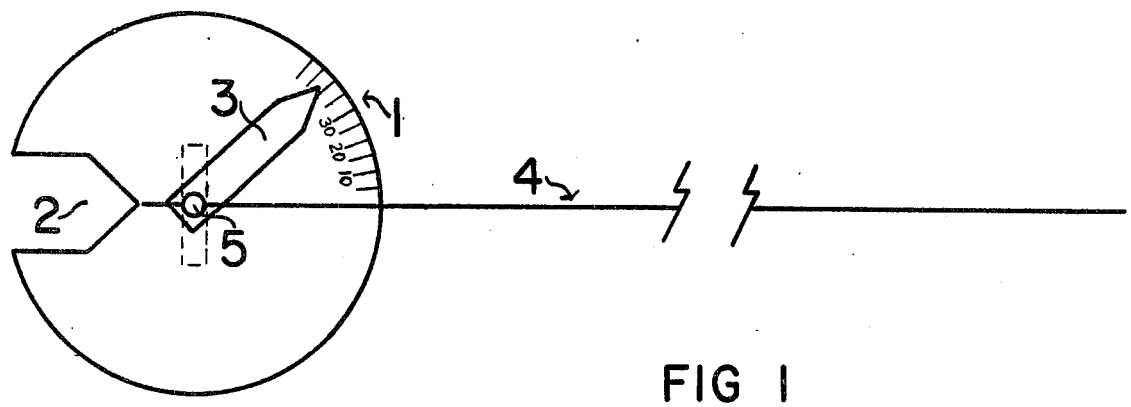
FIG. 1 illustrates a plan view of the apparatus in accordance with a preferred embodiment of the invention.

With reference to FIG. 1, the apparatus in accordance with the invention is generally depicted according to a first preferred embodiment. The apparatus includes a first member 1 which comprises a type of circular protractor which is substantially flat and round in cross section. The protractor 1 is provided on its upper exposed surface with angular gradations marked in ten-degree intervals with numerals as shown. The protractor 1 is also provided with an aperture or slot 2, the purpose of which slot 2 will be described hereinbelow. It should be noted that the longitudinal axis of the slot 2 extends in a line which is collinear with the 0° position of the protractor 1, which 0° position is not shown but which is obviously centrally located between the two 10° markings. In this connection, the ten-degree angular markings of protractor 1 increase in value relative to the aforesaid 0° point on the protractor 1 so as to define increasing angular intervals in both the radial directions relative to the 0° gradation, thus defining the aforementioned two ten degree marked intervals on either side of the zero degree marking.

Intermediate angular gradations, not numerically marked, are also desirably provided between the ten degree marked intervals. In the drawings, such intermediate angular markings are provided at five degree intervals.

Also provided adjacent the exposed surface of protractor 1 is a pointer member 3 which is pivotably secured at a first end thereof to the center of protractor 1 so as to be free to be selectively angularly displaced on the surface of protractor 1 without being so loose as to be easily jarred out of a particular position. Also secured to the center of protractor 1 is a first end of a speed scale member 4 which comprises an elongated bendable strip of material of fixed length and capable of being readily curved into a smooth arc, such as spring steel or flexible plastic. The speed scale 4 and pointer 3 are desirably affixed to protractor 1 by a common fastening means, as more clearly shown in FIG. 2. The fastening means may comprise, for example, a cotter pin 5 which is fastened to the under side of protractor 1 as shown in broken lines in FIG. 1. It is important to note, however, that although the pointer 3 is pivotably secured to protractor 1, it is essential that speed scale 4 be rigidly affixed to the protractor 1. To this end, the cotter pin 5 is rigidly positioned on speed scale 4 and is inserted through a suitable aperture provided in the first end of pointer 3 and a suitable aperture provided in the center of protractor 1, and is finally fastened adjacent the under side of protractor 1. In this manner, the pointer 3 is free to pivot about an axis defined by cotter pin 5, while the first end of speed scale 4 remains rigidly secured.

Figure 2:
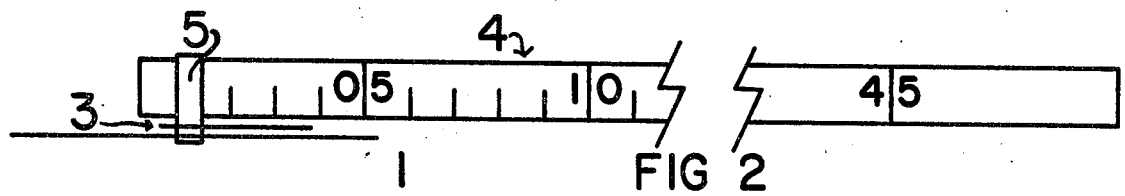
FIG. 2 depicts a side elevational view of the apparatus according to the invention.

Referring to FIGS. 1 and 2, it can be seen that a second or free end of pointer 3 extends into close proximity to the angular gradations disposed on the periphery of protractor 1, to thus permit a particular predetermined one of said gradations to be precisely indicated by pointer 3. With regard to speed scale 4, as shown in FIGS. 1 and 2 the speed scale 4 is quite elongated and extends a substantial distance beyond the peripheral edge of protractor 1. The speed scale 4 has been partially cut away in FIGS. 1 and 2 for the sake of space, however, it should be borne in mind that speed scale 4 may extend, for example, more than one foot beyond the peripheral edge of protractor 1.

Figure 3:
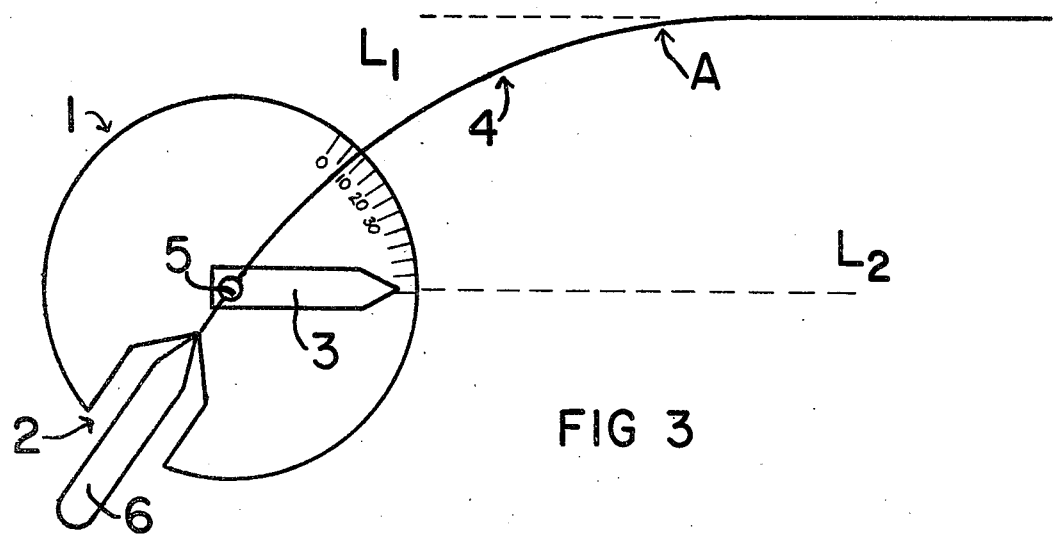
FIG. 3 illustrates a plan view of the apparatus of FIG. 1 shown in use to determine a relative position of a model ship to be moved.

With reference now to FIG. 3, the actual functioning of the apparatus in use will be described. In FIG. 3, the protractor 1 is depicted with a model ship 6 disposed in slot 2 in a first predetermined position. Preferably, in a war game situation, the apparatus is positioned around the stationarily predisposed ship 6 such that the bow of ship 6 is in the inner point of slot 2, and the ship 6 is lined up so that its heading is exactly zero degrees, indicated by the 0° mark on protractor 1. Next, the pointer 3 is angularly displaced on the protractor 1 to point in the desired direction of travel, in this case approximately 55° to the right of the ship's present course as determined from the first predetermined position of ship 6.

At this point it should be noted that speed scale 4 has indicated thereon a series of speed graduations, as generally shown in FIG. 2. The speed graduations increase in value from left to right, with the highest value being marked adjacent the second free extending end of speed scale 4 (FIG. 2).

After the pointer 3 is properly positioned as described above, the next step is to grasp speed scale 4, such as between the thumb and fore finger, adjacent a predetermined speed graduation mark on speed scale 4, while maintaining protractor 1 in a stationary position. In the present example, the speed graduations on speed scale 4 represent knots at which the ship is theoretically able to travel, and the speed scale 4 is grasped by the user adjacent the proper knot marking, such as at position A indicated in FIG. 3, which position might represent, for example, 30 knots. Next, the speed scale 4 is curved into a smooth arc as shown in FIG. 3 such that the direction of the second free end of scale 4 from the point A is in the same direction that the pointer 3 is pointing. The line $L_1$ defined by the free extending end of scale 4 beyond point A is parallel to, but not collinear with, the line $L_2$ defined by the pointer 3, as clearly shown in FIG. 3.

Finally, the ship 6 is moved to the point A on the outside of the curve defined by scale 4, with the ship's direction in such second position being parallel to line $L_2$ defined by pointer 3. It will be noted from FIG. 3 that the thus determined second position of ship 6 will be disposed on a surface which is exterior to the protractor 1. Such exterior surface in most war game situations comprises a substantially flat, smooth surface such that accurate positioning of the ship 6 will be maintained.

With reference to the above described functioning of the invention, it will be noted that as speed scale 4 is curved to determine the second position of ship 6, the first end or zero-point thereof at all times maintains a fixed position substantially adjacent to the bow of the ship 6 within slot 2. This rigid positioning of the first end of scale 4 is important in ultimately achieving an accurate measurement to the second position of ship 6. It should also be noted that as the ship's angular course is determined by speed scale 4, the entire movement distance of ship 6 will normally make up the turning arc defined by scale 4. This gives the ship a larger turn radius at greater theoretical speeds, as would be the case in reality. The construction of the apparatus is also such that no turns would be permitted at minimal speeds, also as in reality. Thus, it can be seen that the present invention provides a very realistic and rapidly obtained measurement of a ship's angular course which corresponds closely to an angular course that a real-life ship might actually travel.

When it is desired to move the ship 6 in a straight course, the above-described series of steps remains basically the same with the exception that the pointer 3 is pointed at the 0° mark and the speed scale 4 is maintained in a straight position comparable to that shown in FIG. 1. In this instance of course, the lines $L_1$ and $L_2$ defined respectively by the speed scale 4 and pointer 3 will be collinear.

Although the foregoing embodiment of the invention has been described and illustrated for use in positioning a model ship 6, the apparatus can also be easily adapted to measure positions of other crafts, such as model aircraft, with a stand being provided on the protractor 1 for accommodating the aircraft in the first predetermined position. Also, for aircraft position measuring, it would of course be necessary to adapt the speed scale 4 to indicate speed graduations such as miles per hour.

In one actual working embodiment of the invention, the speed scale 4 was constructed to be 20 inches in length, with each knot indication being separated approximately 0.4 inch and the maximum knot indication being 50 knots. Exemplary conditions of a war game wherein the apparatus may be employed might be, for example: (1) a distance scale wherein one inch represents 250 yards or 750 feet, with 8 inches representing one nautical mile, within 2%; (2) each game turn represents three minutes of action, such that a ship travelling at one knot travels 0.4 inch in one 3-minute turn; and (3) model ships used are on a scale of 1:2400.

The apparatus as above described is easily maneuverable, and can be repeatedly moved and used to measure varying positions of the object to be moved, from player to player and from turn to turn.

Although there have been described what are at present considered to be the preferred embodiments of the invention, it will be understood that various modifications may be made therein without departing from the spirit or essential characteristics thereof. The present embodiments are therefore to be considered in all respects as illustrative, and not restrictive. The scope of the invention is indicated by the appended claims rather than by the foregoing description.

I claim:

1. An apparatus for measuring relative positions of an object to be moved, comprising:
   first means for indicating the direction of movement for said object to be moved;
   said first means including a first member, said first member being provided with means for positioning in a first predetermined position said object to be moved;
   said first means further including a second member, said second member being adapted to cooperate with said first member to selectively indicate a predetermined angular direction relative to said first predetermined position of said object to be moved;
   second means for determining a second position of said object to be moved, said second means being adapted to cooperate with said first means so as to measure from said first predetermined position to said second position along a predetermined angular course of said object to be moved;
   said second means comprising an elongated bendable strip of fixed length and capable of being curved into a smooth arc, said strip being rigidly secured at a first end thereof to said first member; and
   said elongated bendable strip comprising a speed scale having speed graduations indicated thereon for measuring theoretical speeds of said object to be moved.

2. An apparatus in accordance with claim 1, wherein: said first member has angular gradations indicated thereon, and said second member cooperates with said first member to selectively indicate a predetermined one of said gradations to define said predetermined angular direction relative to said first predetermined position of said object to be moved.

3. An apparatus in accordance with claim 2, wherein: said first member is substantially flat, and circular in cross section; and
   said second member comprises a pointer pivotably secured at a first end thereof to a central portion of said first member.

4. An apparatus in accordance with claim 2, wherein: said first member comprises a circular protractor having said angular gradations indicated adjacent the periphery thereof.

5. An apparatus in accordance with claim 3, wherein: said first member comprises a circular protractor having said angular gradations indicated adjacent the periphery of a first surface of said protractor;
   said pointer is pivotably secured at said first end thereof to a central portion of said circular protractor adjacent said first surface of said protractor; and
   said pointer is adapted to be selectively angularly displaceable on said first surface of said circular protractor about an axis defined by the pivotably secured portion of said first end of said pointer.

6. An apparatus for measuring relative positions of an object to be moved, comprising:
   first means for indicating the direction of movement for said object to be moved;
   said first means including a first member, said first member being provided with means for positioning in a first predetermined position said object to be moved;
   said first means further including a second member, said second member being adapted to cooperate with said first member to selectively indicate a predetermined angular direction relative to said first predetermined position of said object to be moved;
   second means for determining a second position of said object to be moved, said second means being adapted to cooperate with said first means so as to measure from said first predetermined position to said second position along a predetermined angular course of said object to be moved;
   said first member has angular gradations indicated thereon, and said second member cooperates with said first member to selectively indicate a predetermined one of said gradations to define said predetermined angular direction relative to said first predetermined position of said object to be moved;
   said second means comprising an elongated flexible member rigidly secured at a first end thereof to said first member;
   said elongated flexible member comprising a speed scale having speed graduations indicated thereon for measuring theoretical speeds of said object to be moved;
   said first member is substantially flat, and circular in cross section;
   said second member comprising a pointer pivotably secured at a first end thereof to a central portion of said first member;
   said first member comprising a circular protractor having said angular gradations indicated adjacent the periphery of a first surface of said protractor;
   said pointer being pivotably secured at said first end thereof to a central portion of said circular protractor adjacent said first surface of said protractor;
   said pointer being adapted to be selectively angularly displaceable on said first surface of said circular protractor about an axis defined by the pivotably secured portion of said first end of said pointer;

said pointer including a second end thereof adapted to selectively point to a predetermined one of said angular gradations when said pointer is selectively angularly displaced on said first surface of said circular protractor; and said means for positioning in said first predetermined position said object to be moved comprises a slot provided in said circular protractor, said slot being adapted to receive at least a portion of said object to be moved.

7. An apparatus in accordance with claim 6, wherein:

said first end of said speed scale is rigidly secured to said central portion of said circular protractor adjacent said first surface of said protractor;

said first end of said speed scale is disposed proximal to said slot so as to measure from at least a portion of said object to be moved when said object is positioned in said first predetermined position in said slot; and a second end of said speed scale is adapted to be freely and selectively angularly displaced adjacent a surface exterior to said apparatus to permit said second position of said object to be moved to be determined.

8. An apparatus in accordance with claim 7, wherein:

said speed graduations indicated on said speed scale are arranged with said speed graduations increasing in value in the direction from said first end of said speed scale to said second end of said speed scale.

9. An apparatus in accordance with claim 8, wherein:

said object to be moved comprises a model ship; and said speed graduations represent knots at which said model ship is theoretically moving.

10. An apparatus in accordance with claim 8, wherein:

said second position of said object to be moved is defined by a particular point on said speed scale from which said second end of said speed scale extends co-directional with said second end of said pointer when said pointer is selectively pointing to said predetermined one of said angular gradations on said first surface of said circular protractor.

11. An apparatus in accordance with claim 1, wherein:

said means for positioning in said first predetermined position said object to be moved comprises a slot provided in said first member, said slot being adapted to receive at least a portion of said object to be moved.

* * * * *